United States Patent
Yu et al.

(10) Patent No.: US 11,764,390 B1
(45) Date of Patent: Sep. 19, 2023

(54) AUTOMATIC PRODUCTION LINE FOR CASCADE UTILIZATION OF POWER BATTERIES

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Jindong Wu, Foshan (CN); Yinghao Xie, Foshan (CN); Xuemei Zhang, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN, BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/245,126

(22) PCT Filed: Apr. 30, 2021

(86) PCT No.: PCT/CN2021/091661
§ 371 (c)(1),
(2) Date: Mar. 13, 2023

(87) PCT Pub. No.: WO2022/088642
PCT Pub. Date: May 5, 2022

(30) Foreign Application Priority Data

Oct. 30, 2020 (CN) .......................... 202011190072.9

(51) Int. Cl.
*H01M 10/04* (2006.01)
*H01M 10/48* (2006.01)
*H01M 10/42* (2006.01)

(52) U.S. Cl.
CPC ... *H01M 10/0404* (2013.01); *H01M 10/0481* (2013.01); *H01M 10/4285* (2013.01); *H01M 10/482* (2013.01)

(58) Field of Classification Search
CPC ......... H01M 10/0404; H01M 10/0481; H01M 10/4285; H01M 10/482
See application file for complete search history.

(56) References Cited

U.S. PATENT DOCUMENTS

2015/0311561 A1   10/2015  Friedenberger et al.

FOREIGN PATENT DOCUMENTS

| CN | 107895810 A | * | 4/2018 | ........ H01M 10/0404 |
| CN | 108199109 A | | 6/2018 | |

(Continued)

OTHER PUBLICATIONS

International Search Report and Written Opinion in PCT/CN2021/091661 dated Jul. 27, 2021.

*Primary Examiner* — Jimmy Vo
(74) *Attorney, Agent, or Firm* — Buchalter; Jason W. Croft

(57) ABSTRACT

Disclosed is an automatic production line for cascade utilization of power batteries, which is sequentially provided along the transmission direction of materials with: an appearance detection system, a screening device, a transport system, a residual energy detection device, a tab installation device and an assembling system, and in addition, is provided with a grouping device and a film sticking device, (Continued)

where the grouping device is located among the residual energy detection device, the tab installation device and a grouping station.

10 Claims, 14 Drawing Sheets

(56) References Cited

FOREIGN PATENT DOCUMENTS

| | | | |
|---|---|---|---|
| CN | 108448194 | A | 8/2018 |
| CN | 112242550 | A | 1/2021 |
| CN | 111689249 | A | 9/2022 |
| WO | 2022088642 | A1 | 5/2022 |

* cited by examiner

AUTOMATIC PRODUCTION LINE FOR CASCADE UTILIZATION OF POWER BATTERIES

CROSS-REFERENCE TO RELATED APPLICATION

This application is a national stage filing under 35 U.S.C. § 371 of international application number PCT/CN2021/091661, filed Apr. 30, 2021, which claims priority to Chinese patent application No. 202011190072.9 filed Oct. 30, 2020. The contents of these applications are incorporated herein by reference in their entirety.

TECHNICAL FIELD

The present disclosure relates to the technical field of recycling retired power batteries, in particular to an automatic production line for cascade utilization of power batteries.

BACKGROUND

The retired power batteries are treated with two different treatment methods according to the battery capacity: retired power batteries with a battery capacity of 20%-80% can be subjected to cascade utilization, and retired power batteries with a remaining battery level of less than 20% need to be recycled and regenerated. The cascade utilization fully exploits the utilization of retired lithium batteries, and products subjected to cascade utilization can be used in telecommunication base stations, small distributed energy storage systems, substation DC charging systems and small power trams. In particular, 5G base stations are small in cover area and their number will be five times that of 4G base stations. It is expected that the demand for batteries for telecommunication base stations will exceed 50+ GWh in the next five years, so there will be a substantial increase in the demand for products subjected to cascade utilization.

Most of the tab installation and residual energy detection in the production process of the existing products subjected to cascade utilization are semi-automatic, and appearance inspection, protective film sticking and product assembly of retired batteries are all in manual operations with a large amount of personnel input, during which, improper operations easily lead to safety accidents such as short circuit and fire, and thus generate great potential safety hazards. Furthermore, the above manual operations have low efficiency and insufficient accuracy, so are not suitable for cascade utilization of large-scale retired power batteries with obvious limitations.

SUMMARY

The present disclosure aims at solving at least one of the technical problems existing in the prior art. Therefore, the present disclosure provides an automatic production line for cascade utilization of power batteries, which can realize the automation of a whole process including appearance detection, voltage detection, residual energy detection, grouping, tab installation, assembling and the like of cascade utilization of retired power batteries.

According to the embodiments of the first aspect of the present disclosure, provided is an automatic production line for cascade utilization of power batteries, which is sequentially provided along a transmission direction of materials with:

an appearance detection system including an appearance scanner, a first flipping device and a voltage detector, where three surfaces of a battery cell are detected by the appearance scanner, and then the battery cell is flipped 180° by the first flipping device, and then the remaining three surfaces of the battery cell are detected;

a screening device including a first gripper for clamping battery cells with unqualified appearance and low voltage;

a transport system including a second flipping device and a delivery mechanism, where the battery cell is flipped 90° by the second flipping device so that an electrode is faced upward, and the flipped battery cell is delivered to the next process by the delivery mechanism;

a residual energy detection device including a plurality of capacity measuring chambers, above which a capacity measuring needle is provided, where the capacity measuring needle is capable of contacting with the electrodes of the battery cell after the battery cell enters the capacity measuring chamber;

a tab installation device including a drilling mechanism and a screwing station;

an assembling system sequentially provided with a grouping station, a tab welding station and a cover plate installation station, where each station operates through a mechanical arm, the grouping station places the battery cells installed with the tab into an energy storage cabinet according to the staggered arrangement of positive and negative electrodes, the tab welding station connects the battery cells with staggered positive and negative electrodes in series, and the cover plate installation station connects an upper cover with the energy storage cabinet; and a grouping device including a second gripper that is located among the residual energy detection device, the tab installation device and the grouping station, where the second gripper sorts and clamps the battery cells subjected to residual energy detection to the tab installation device for tab installation followed by clamping to the grouping station.

According to the embodiments of the present disclosure, the automatic production line for cascade utilization of power batteries at least has the following beneficial effects:

1. The present disclosure realizes the automation of a whole process including appearance detection, voltage detection, residual energy detection, grouping, tab installation, assembling and the like of cascade utilization of retired power batteries.

2. The present disclosure completes three-dimensional data collection of the appearance of the battery cell in the transmission process of the battery cell through the appearance detection system, thereby realizing the high efficiency and accuracy of the appearance detection of the retired power batteries, and avoiding human errors such as misjudgment and missed detection in the traditional detection.

3. The residual energy detection device adopted by the present disclosure can realize batch detection, automatic feeding and discharging, and automatic grouping, thus solving the problems of large labor, low detection efficiency, high grouping error rate and the like in traditional residual energy detection.

4. The tab installation device adopted by the present disclosure realizes the integration of drilling and screwing, can operate continuously and reduces the technological process of tab installation, thereby shortening the working procedure of tab installation, and greatly improving the production efficiency.

5. The present disclosure adopts a multi-mechanical arm cooperative assembling mode to assemble the products subjected to cascade utilization, thereby realizing the automation of assembling with a high degree of automation, fully ensuring the consistency of product quality, and greatly reducing the potential safety hazard generated by the traditional manual assembling.

According to some embodiments of the present disclosure, the present disclosure further includes a film sticking device, where the screening device is capable of clamping the battery cells with unqualified appearance to the film sticking device for film sticking; and the film sticking device includes:
- a film sticking platform, and a film belt spreading mechanism for spreading the film roll and laying the spread film on the film sticking platform to form a film belt;
- a first rolling rod assembly including two first rolling rods that are horizontally provided, where the first rolling rods are located below the film belt, and in a working state, the battery cell is placed on the film belt, the two first rolling rods move upwards to attach the film belt to the front and rear surfaces of the battery cell;
- a second rolling rod assembly provided on both sides of the film sticking platform, where the second rolling rod assembly includes second rolling rod brackets that is capable of being opened and closed, each of the second rolling rod brackets is provided with two vertical second rolling rods, and the second rolling rod assembly is capable of moving to both sides of the battery cell and driving the second rolling rods to roll on the left and right sides of the battery cell through the opening and closing movement of the second rolling rod brackets so that the film belt is attached to the left and right sides of the battery cell; and
- a pressure rod absorbing the film paper and moves to the upper part of the battery cell and pressing the film paper to the upper surface of the battery cell.

According to some embodiments of the present disclosure, the appearance detection system includes a first conveyor belt and a second conveyor belt which are perpendicular to each other, where appearance detection instruments are respectively provided on both sides of and above the first conveyor belt and the second conveyor belt, and the first flipping device is located between the output end of the first conveyor belt and the input end of the second conveyor belt.

According to some embodiments of the present disclosure, the first flipping device includes a rotating bracket and a first push rod, where the rotating bracket is provided with a loading chamber for loading battery cells, the front and rear of the loading chamber are respectively provided with battery inlet and outlet and a push port, the battery inlet and outlet are aligned with the output end of the first conveyor belt, the battery cell enters the loading chamber from the battery inlet and outlet, the rotating bracket rotates 180° to drive the loading chamber to flip 180°, and then the first push rod enters the loading chamber through the push port to push the battery cell out to the input end of the second conveyor belt, and the voltage detector is provided on the first push rod.

According to some embodiments of the present disclosure, the delivery mechanism is a third conveyor belt, the second flipping device is located between the output end of the appearance detection system and the input end of the third conveyor belt, and the second flipping device includes a first baffle plate that is telescopic, a flipping table, a traveling rail and a pulling mechanism, where the first baffle plate is located on the third conveyor belt, the traveling rail is parallel to the third conveyor belt, and a second push rod is provided on one side of the end of the third conveyor belt; the flipping table is horizontally provided in an initial state, and when working, the pulling mechanism pulls the flipping table to move along the traveling rail until the flipping table enters the third conveyor belt and then reaches the first baffle plate and flips 90° so that the electrodes of the battery cell are faced upward.

According to some embodiments of the present disclosure, the pulling mechanism includes a slide rail and a connecting rod, where the slide rail is parallel to the third conveyor belt and is located above the side of the flipping table, one end of the connecting rod is movably connected with the slide rail and the other end of the connecting rod is connected with the flipping table.

According to some embodiments of the present disclosure, the residual energy detection device includes:
- a capacity measuring frame being of a vertical multi-layer frame structure in which each layer is provided with a certain number of the capacity measuring chambers;
- a feeding mechanism including a liftable loading rack, a jacking transport trolley and a first lifting table, where the first lifting table is provided on the lateral side of the loading rack for lifting movement, the jacking transport trolley is capable of moving below the loading rack and lifting the loading rack, and the jacking transport trolley is capable of moving back and forth between the capacity measuring frame and the first lifting table;
- when feeding, the loading rack is loaded with the battery cells and rises to any layer of the loading rack through the first lifting table, and then is transported to the capacity measuring chamber through the jacking transport trolley, and the loading rack lifts the battery cells until the electrode of the battery cell contacts with the capacity measuring needle; and
- a second lifting table located on the side of the loading rack to carry out lifting movement, where the jacking transport trolley is capable of moving back and forth between the capacity measuring frame and the second lifting table, and when discharging, the jacking transport trolley transports the loading rack to the second lifting table and descends along with the second lifting table.

According to some embodiments of the present disclosure, the tab installation device further includes:
- a working table, the drilling mechanism being installed on the working table, the drilling mechanism including two drill bits that are vertically downward, the screwing station being installed on the working table, and the screwing station including two nail dropping openings;
- a horizontal rotating table located between the drilling mechanism and the screwing station, where the rotating table is provided with a clamping mechanism for clamping the power batteries; and
- when working, the electrodes of the power battery are faced upward and are clamped by the clamping mechanism and then rotate to the drilling mechanism along with the rotating table so that the two electrodes of the power battery are respectively aligned with the two drill bits, and the drilled power batteries are rotated to the screwing station along with the rotating table so that two electrodes of the power batteries are respectively aligned with the two nail dropping openings.

According to some embodiments of the present disclosure, the tab welding station includes a solderer for soldering tabs and wires together, and the solderer is driven by a mechanical arm.

According to some embodiments of the present disclosure, the cover plate installation station includes an electromagnetic suction cup and a screwing mechanism which are respectively driven by a mechanical arm.

According to some embodiments of the present disclosure, the first gripper is driven by a mechanical arm, and the first gripper includes a horizontal gripper bracket, both ends of the gripper bracket are symmetrically provided with vertical splints, and the splints are driven by hydraulic cylinders to perform opening and closing clamping movement.

BRIEF DESCRIPTION OF DRAWINGS

The above-mentioned and/or additional aspects and advantages of the present disclosure will become apparent and be easily understood from the description of the embodiments in conjunction with the following drawings, where.

Figure 1:
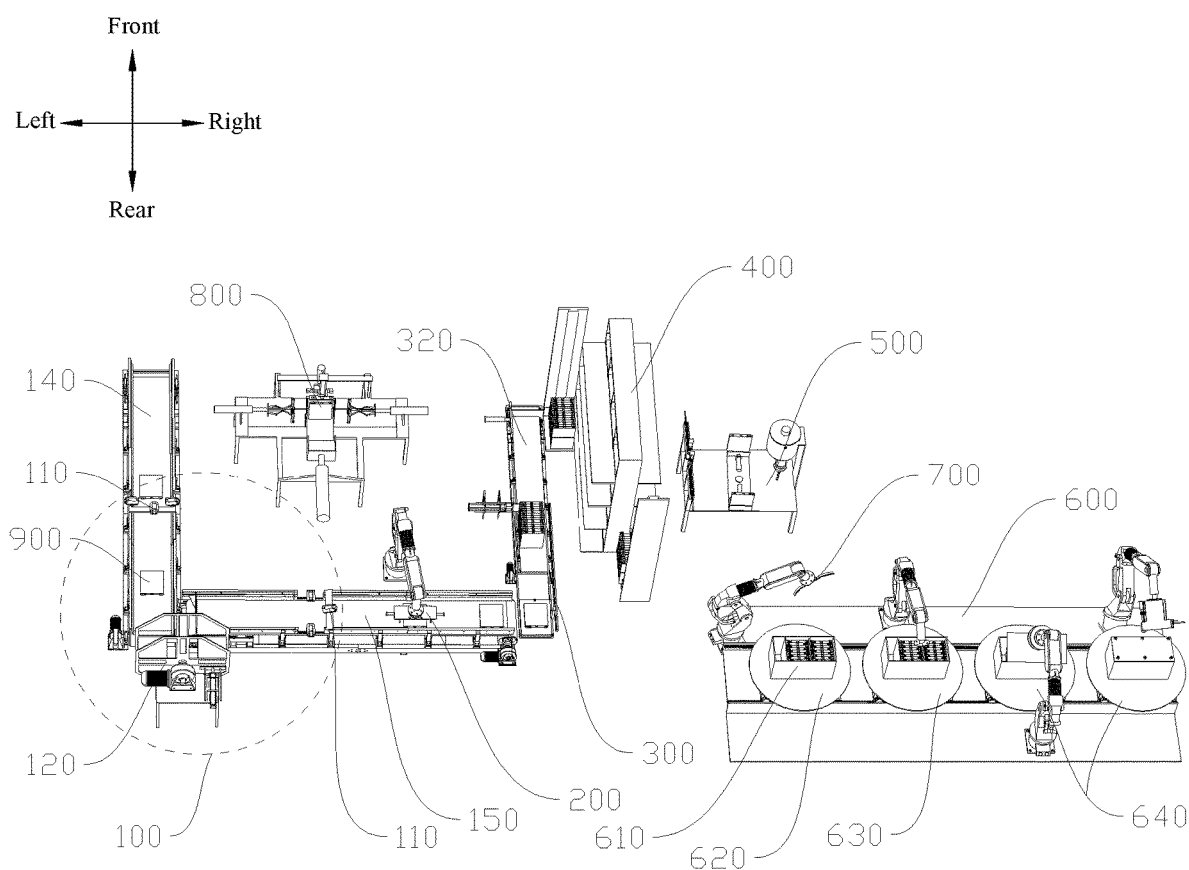
FIG. 1 is a schematic diagram of an overall structure of an embodiment of the present disclosure.
Figure 2:
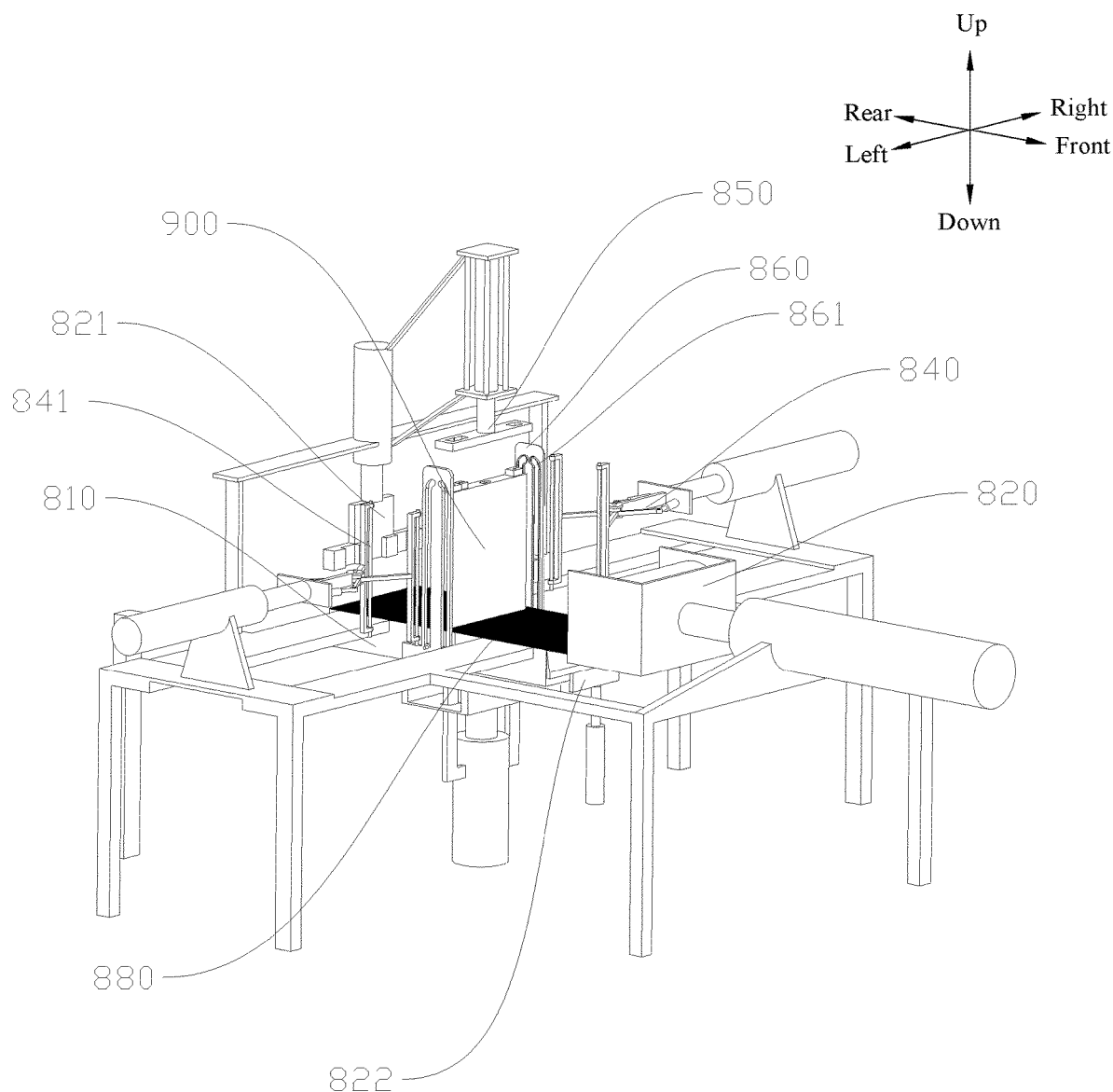
FIG. 2 is a schematic diagram of an overall structure of a film sticking device.
Figure 3:
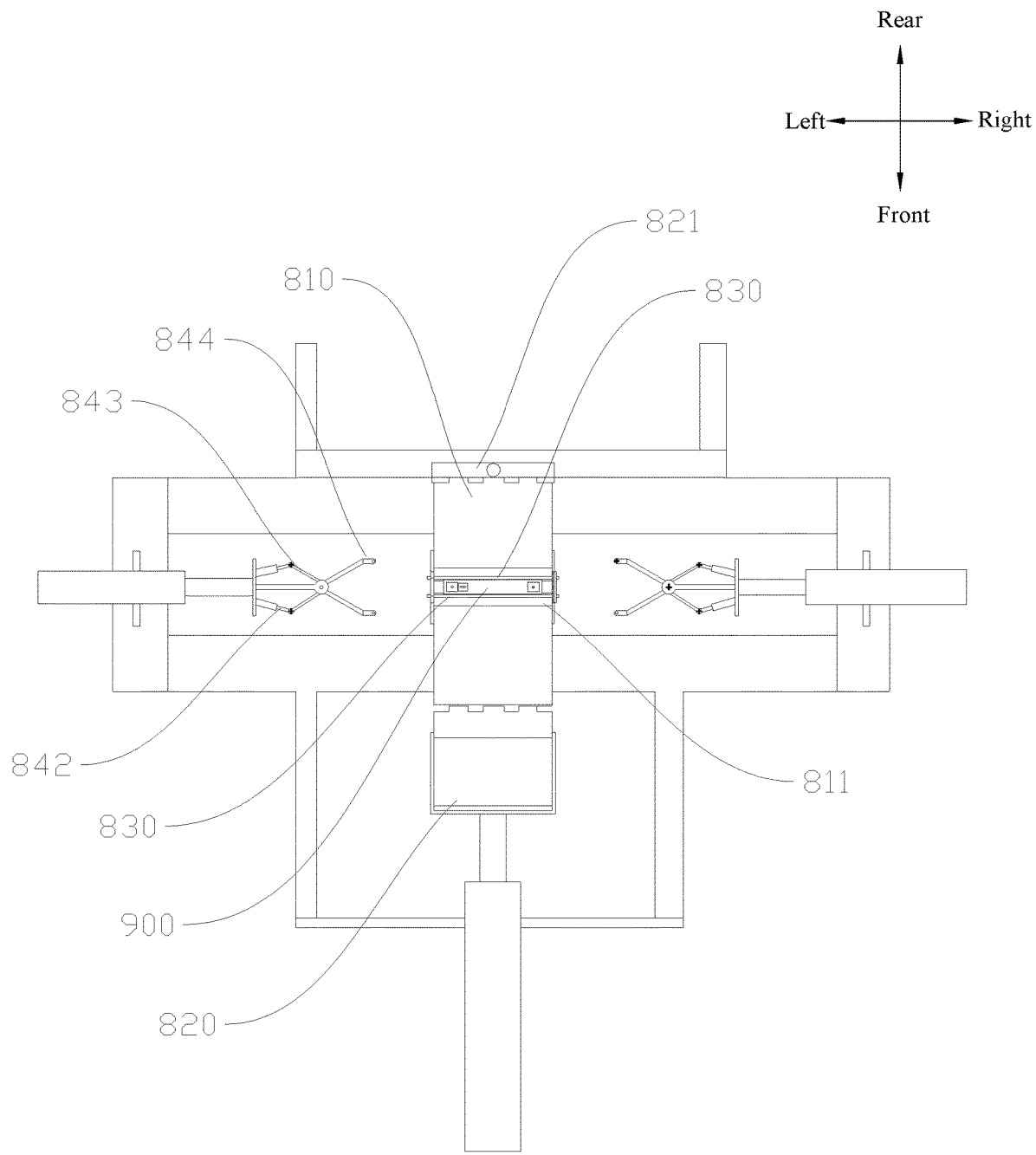
FIG. 3 is a top view of a film sticking device.
Figure 4:
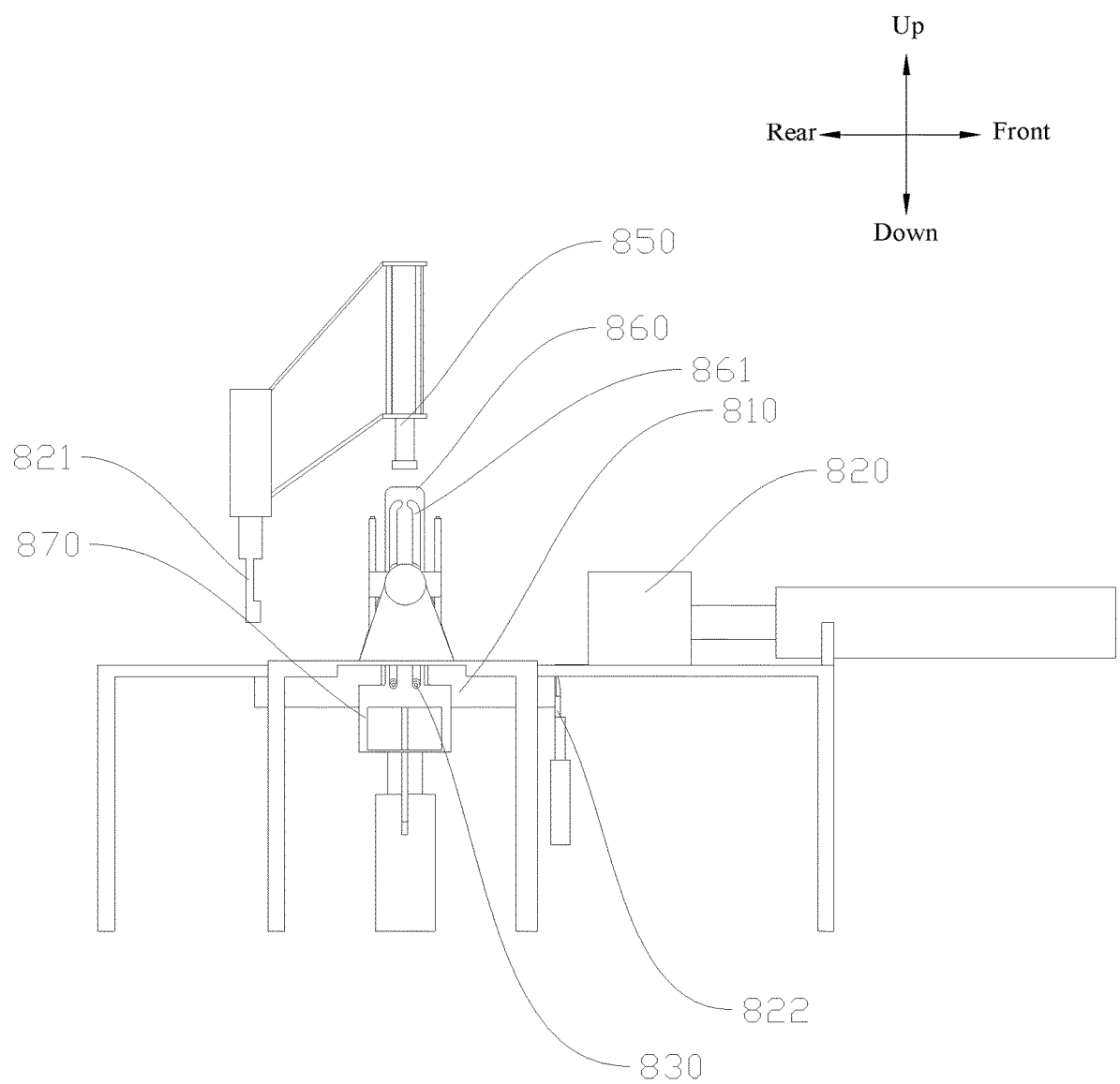
FIG. 4 is a side view of a film sticking device.
Figure 5:
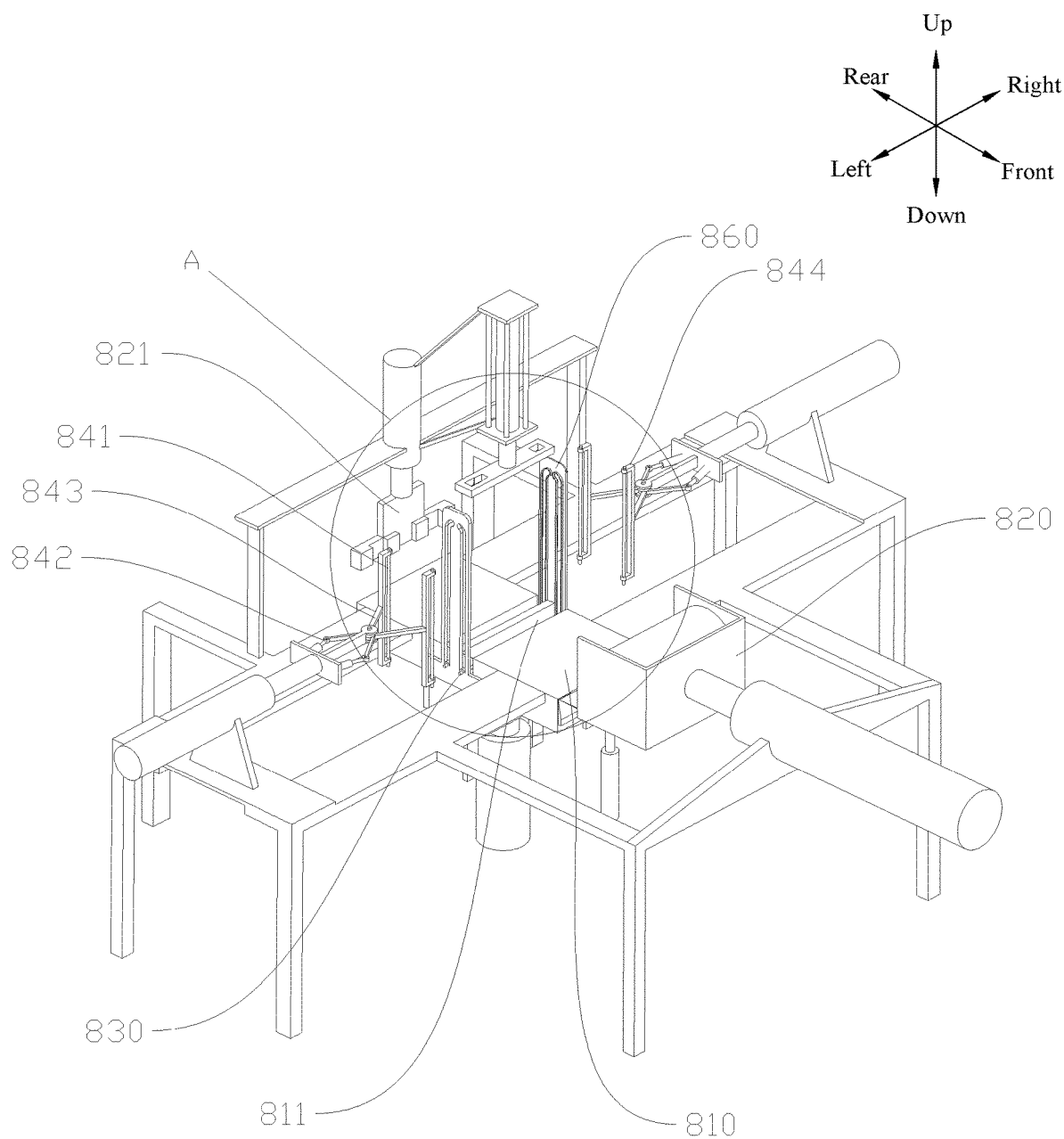
FIG. 5 is a structural schematic diagram of another vision of FIG. 2.
Figure 6:
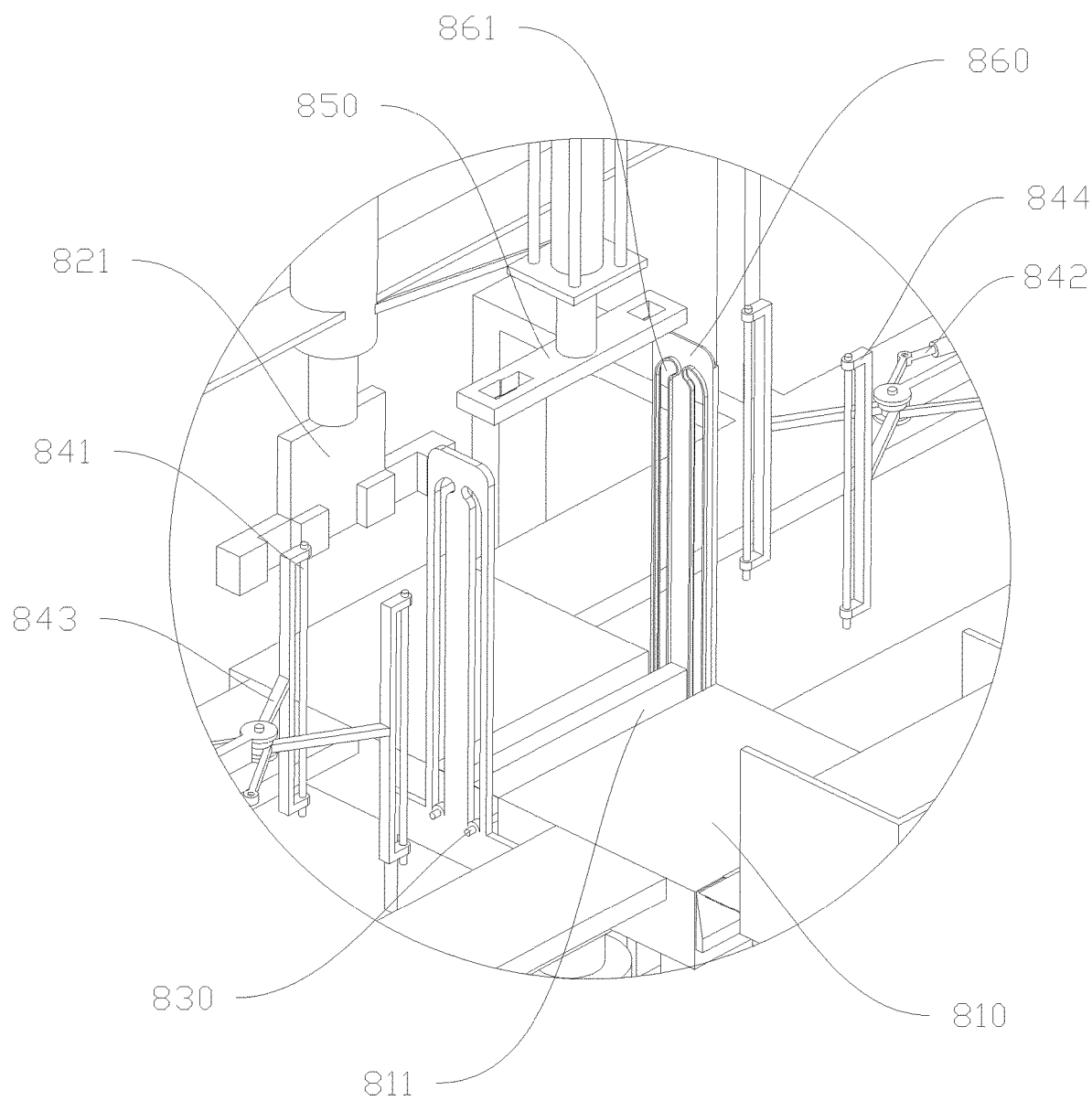
FIG. 6 is an enlarged partial view at A in FIG. 5.

Appearance detection system 100, appearance scanner 110, first flipping device 120, rotating bracket 121, first push rod 122, loading chamber 123, first conveyor belt 140, second conveyor belt 150, first gripper 200, transport system 300, flipping table 310, third conveyor belt 320, gear rod 321, first baffle plate 331, traveling rail 332, slide rail 333, slider 334, sliding slot 335, first connecting rod 336, residual energy detection device 400, capacity measuring chamber 410, capacity measuring frame 420, front transport plate 421, rear transport plate 422, loading rack 430, bottom plate 431, horizontal support plate 432, side plate 433, jacking transport trolley 440, first lifting table 450, second lifting table 460, capacity measuring needle 470, screw shaft 481, cross bar 482, telescopic frame mechanism 483, third connecting rod 484, fourth connecting rod 485, limit block 490, tab installation device 500, drilling mechanism 510, drill bit 511, screwing mechanism 520, nail dropping opening 521, long sliding slot 522, limit dire assembly 523, fifth push rod 524, screwdriver 525, opening and closing hinge 526, spring 527, sleeve 528, working table 530, rotating table 540, second baffle plate 551, fourth push rod 552, assembling system 600, energy storage cabinet 610, grouping station 620, tab welding station 630, cover plate installation station 640, second gripper 700, film sticking device 800, film sticking platform 810, through slot 811, film roll box 820, film pressing cross bar 821, cutting knife 822, first rolling rod 830, second rolling rod bracket 840, second rolling rod 841, third push rod 842, second connecting rod 843, installing bracket 844, pressure rod 850, first rolling rod bracket 860, rolling rail 861, positioning block 870, film belt 880 and battery cell 900.

DETAILED DESCRIPTION

The embodiments of the present disclosure will be described in detail below. Examples of the embodiments are shown in the drawings, in which the same or similar reference numerals indicate the same or similar elements or elements having the same or similar functions from the beginning to the end. The following embodiments described with reference to the drawings are illustrative and only used to explain the present disclosure, but cannot be interpreted as the restrictions of the present disclosure.

Referring to FIG. 1, an automatic production line for cascade utilization of power batteries is sequentially provided along the transmission direction of materials with:

an appearance detection system 100 which is mainly used for acquiring appearance information by detecting the appearance of a battery cell 900, and meanwhile detecting the voltage of the battery cell 900 to provide data for sorting of a screening device. The appearance detection system 100 includes an appearance scanner 110, a first flipping device 120 and a voltage detector, three surfaces of the battery cell 900 are detected by utilizing the appearance scanner 110, and then the battery cell 900 is flipped 180° by the first flipping device 120, and then the remaining three surfaces of the battery cell 900 are detected, and the voltage of the battery cell 900 is also detected in this process;

a screening device which is used for preliminarily screening the battery cell 900 based on the results fed back by the appearance detection system 100 and the voltage detector to remove the battery cell 900 with an unqualified appearance and a voltage being less than 1.5 V, and includes a first gripper 200 for clamping the battery cell 900 with an unqualified appearance;

a transport system 300 which is used for flipping and aggregating the battery cells 900 that have passed the appearance detection and have been filmed to form a set of battery cells 900 so as to provide convenience for subsequent residual energy detection, and includes a second flipping device and a delivery mechanism, where the second flipping device catches the battery cells 900 transferred from the previous process, and the battery cells 900 are flipped 90° by the second flipping device so that the electrode is faced upward, and a certain quantity of flipped battery cells 900 are gathered on the delivery mechanism and then are completely transported to the next process, that is, a residual energy detection device 400;

the residual energy detection device 400 which is an important detection link of cascade utilization, is used for detecting the capacity of the battery by charging and discharging the power battery and then grouping the power battery cells 900 with similar capacitance so as to provide data support for grouping and sorting in the next step as a fact, and includes a plurality of capacity measuring chambers 410 above which a capacity measuring needle 470 is provided, where the capacity measuring needle 470 can contact with the electrodes of the battery cell 900 after the gathered battery cells 900 enter the capacity measuring chamber 410;

a tab installation device 500 which is used for implementing tab installation through drilling and screwing, and includes a drilling mechanism 510 and a screwing station, where the electrodes of the battery cell 900 are drilled on the tab installation device 500, and then tab installation is performed in the screwing station;

an assembling system 600 which is used for installing the battery cell 900 subjected to grouping and tab installation in an energy storage cabinet 610, so as to form products subjected to cascade utilization for such as energy storage through assembling, where the energy storage cabinet 610 is composed of main parts such as a control plate installation chamber, an energy storage chamber and wire communication holes, the assembling system 600 being sequentially provided with an grouping station 620, a tab welding station 630 and a cover plate installation station 640, and operation is performed on each station through a mechanical arm, the assembling system 600 further including a rail-type transmission base 650 and a moving platform 660, where the moving platform 660 carries the energy storage cabinet 610 to move on the transmission base 650 so that the energy storage cabinet 610 sequentially passes through the grouping station 620, the tab welding station 630 and the cover plate installation station 640, the grouping station 620 places the battery cells 900 installed with the tabs into the energy storage cabinet 610 according to the staggered arrangement of positive and negative electrodes, and then the energy storage cabinet 610 moves to the tab welding station 630 to connect the battery cells 900 with staggered positive and negative electrodes in series, and after the positive and negative electrodes of the power batteries in the energy storage chamber are connected in series, the energy storage cabinet 610 moves to the cover plate installation station 640 to connect an upper cover with the energy storage cabinet 610, and then the whole automatic production of the product subjected to cascade utilization is completed; and a grouping device which is used for sorting and clamping a group of power battery cells based on processing of data fed back by the residual energy detection device 400 on a control platform, that is, grouping in cascade utilization, and placing the power battery cells 900 with the same capacitance and voltage together, the grouping device being composed of a mechanical arm and a second gripper 700, where the grouping device is located among the residual energy detection device 400, the tab installation device 500 and the grouping station 620, the second gripper 700 sorts and clamps the battery cells 900 subjected to residual energy detection to the tab installation device 500 for tab installation and then clamps them to the grouping station 620 for grouping and placement.

In some of these embodiments, referring to FIGS. 2-6, the present disclosure further includes a film sticking device 800, and the screening device can clamp the battery cells 900 with unqualified appearance to the film sticking device 800 for film sticking; and the film sticking device 800 includes:

a film sticking platform 810;

a film belt spreading mechanism for spreading the film roll and laying it on the film sticking platform 810 to form a film belt 880;

a first rolling rod assembly including two first rolling rods 830 that are horizontally provided, a distance between the two first rolling rods 830 being slightly larger than the width of the battery cell 900, where the first rolling rod 830 is located below the film belt 880, and in a working state, the battery cell 900 is placed on the film belt 880 and located between the two first rolling rods 830, the two first rolling rods 830 move upwards to attach the film belt 880 to the front and rear surfaces of the battery cell 900, and then the first rolling rod 830 is reset;

it should be noted that the width of the film belt 880 is slightly larger than the length plus width of the battery cell 900, and after the film sticking on the front and rear surfaces is completed, and film paper of protruded parts of the left and right sides of the battery cell 900 is used for wrapping the left and right surfaces of the battery cell 900;

a second rolling rod assembly provided on both sides of the film sticking platform 810, where the second rolling rod assembly includes second rolling rod brackets 840 that can be opened and closed, each of the second rolling rod brackets 840 is provided with two vertical second rolling rods 841, and when working, the second rolling rod assembly moves to both sides of the battery cell 900 and drives the second rolling rods 841 to roll on the left and right sides of the battery cell 900 through the horizontal opening and closing movement of the second rolling rod bracket 840 so that the film paper protruding from the left and right sides of the battery cell 900 is coated in the middle and attached onto the battery cell 900, and thus the film sticking on the left and right sides of the battery cell 900 is completed; and a pressure rod 850 which can be driven by a mechanical arm or an air cylinder, where the pressure rod 850 is provided with an air suction hole, and when working, the pressure rod 850 absorbs the film paper and moves to the upper part of the battery cell 900 and presses the film paper to the upper surface of the battery cell 900. A pressure head is provided below the pressure rod 850, where the pressure head is slightly larger than the area of the upper surface of the battery cell 900, and the pressure head is provided with holes matched with electrodes, and when pressed, the electrodes can smoothly pass through the holes so that the film paper is attached to the upper surface of the battery cell 900 without covering the electrodes. It should be noted that the film paper adsorbed by the pressure rod 850 is a single small piece of film paper with electrode openings left thereon.

The film sticking device 800 sequentially sticks films on the front, rear, left, right and upper surfaces of the battery cell 900 through the first rolling rod assembly, the second rolling rod assembly and the pressure rod 850, thus realizing automatic film sticking of the battery cell 900, with high efficiency of film sticking and good quality, and without many bubbles, missed film sticking and the like due to manual film sticking.

In some of these embodiments, the film belt spreading mechanism includes a film roll box 820 that can move back and forth, a film pressing cross bar 821, and a cutting knife 822 for cutting the film belt 880, where the film pressing cross bar 821 is located on the rear side of a film sticking platform 810, and when working, the film roll box 820 is loaded with film rolls, and the film roll box 820 moves backward from the front direction of the film sticking platform 810 to the lower part of the film pressing cross bar 821, and after the film pressing cross bar 821 moves downward to press the film roll box 880, the film roll box 820 retracts forward to spread and lay the film belt 880 on the film sticking platform 810, and then the film belt 880 is separated from the film roll by cutting upward with the cutting knife 822. The film belt spreading mechanism has single structure, rapid response and high working efficiency.

In some of these embodiments, a bottom plate 431 of the film roll box 820 extends outward to form a protrusion, the front end of the protrusion is provided with a concave-convex tooth profile, and the film pressing cross bar 821 is provided with a tooth profile matched with the protrusion. This structure enables the film pressing cross bar 821 to press the film belt 880 in a staggered manner without pressing the film roll box, ensuring smooth retraction of the film roll box.

In some of these embodiments, the film sticking platform 810 is provided with two parallel through slots 811 located in the center of the film sticking platform 810, where the two through slots 811 are spaced about a distance of the width of the battery cell 900, and the platform between the two through slots 811 is used for placing the battery cell 900; and the first rolling rod assembly further includes two first rolling rod brackets 860 that can move up and down, where the first rolling rod brackets 860 are vertically provided on the left and right sides of the film sticking platform 810, and each first rolling rod bracket 860 is provided with two symmetrical rolling rails 861, where the first rolling rod 830 can move up and down along the rolling rails 861, and the first rolling rod 830 can pass through the through slot 811. In an initial state, the top end of the first rolling rod bracket 860 is not higher than the film sticking platform 810, and when working, the first rolling rod bracket 860 moves upward from the lower direction of the film sticking platform 810 until the top end of the rolling rail 861 is slightly higher than the battery cell 900, the first rolling rod 830 moves from bottom to top through the through slot 811 to attach the film belt 880 to the front and rear surfaces of the battery cell 900, and then the first rolling rod bracket 860 descends to return to the initial state. The first rolling rod bracket 860 provides a guide rail that moves up and down for the first rolling rod 830, that is, a rolling rail 861, to improve the stability of the movement of the first rolling rod 830.

In some of these embodiments, the first rolling rod assembly further includes horizontal positioning blocks 870, where the two first rolling rod brackets 860 are connected through the positioning blocks 870, and the positioning blocks 870 are connected to the air cylinders. When the positioning block 870 abuts against the film sticking platform 810, the target position has been reached, and the two first rolling rod brackets 860 are in an integrated structure and driven by air cylinders, which ensures that the movements of the two first rolling rod brackets 860 are completely synchronized and easier to control and adjust.

In some of these embodiments, the second rolling rod bracket 840 is composed of two horizontal third push rods 842, two horizontal second connecting rods 843, and two vertically provided installing brackets 844, where the third push rod 842 is driven by an air cylinder, and the middle parts of the two second connecting rods 843 are hinged in a scissors shape, one end of the second connecting rod 843 is hinged with the third push rod 842, and the other end is fixedly connected with the installing bracket 844, and the second rolling rod 841 is rotationally connected to the installing bracket 844. When working, the air cylinder drives the third push rod 842, the third push rod 842 pushes the second connecting rod 843, and the second connecting rod 843 rotates around the hinge, so that the installing bracket 844 at the end of the second connecting rod 843 is opened outward, and the installing bracket 844 is closed inward when the air cylinder is retracted, and the reciprocating motion of the air cylinder realizes the opening and closing of the second rolling rod bracket 840, the structure of which is simple and lightweight.

In some of the embodiments, the first rolling rod 830 is driven by a motor to roll the first rolling rod 830 up and down along the rolling rail 861, and the first rolling rod 830 and the rolling rail 861 may be in a rack-and-pinion fit, the structure of which has good stability, convenient installation and low cost.

Figure 7:
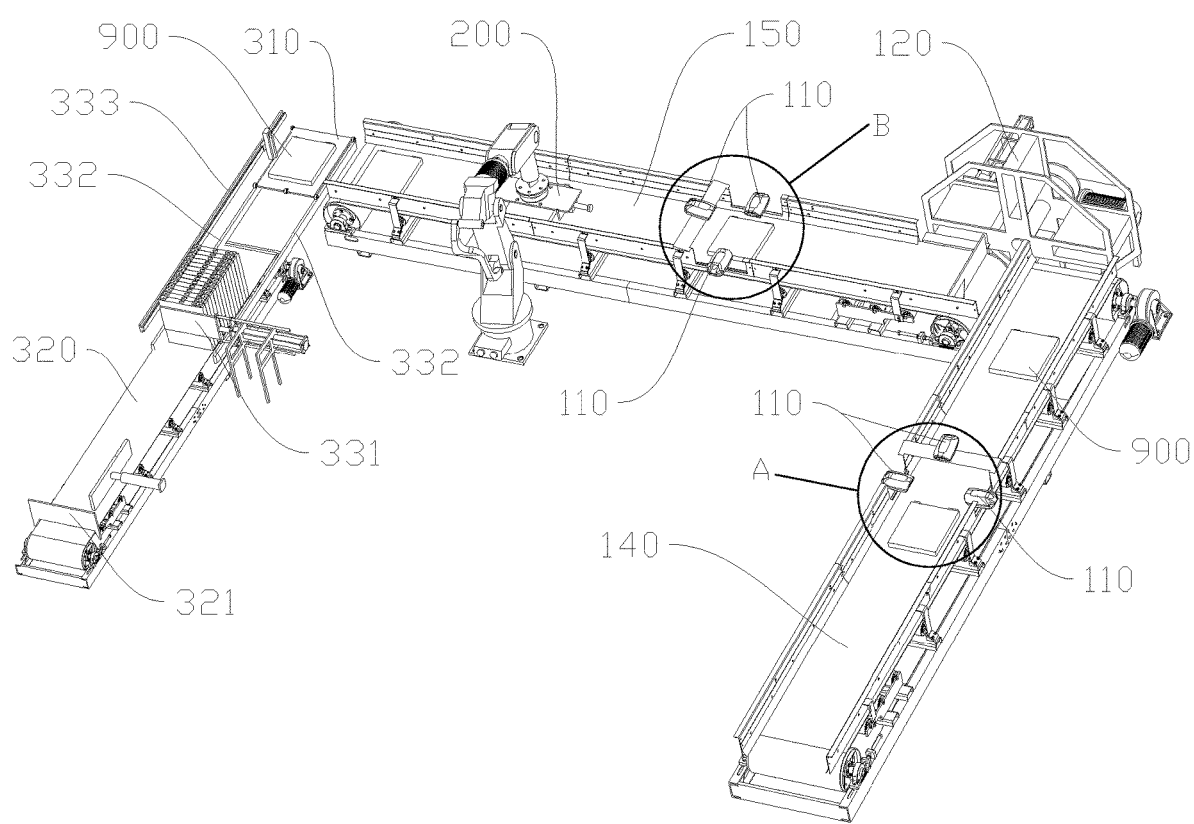
FIG. 7 is a structural schematic diagram of an appearance detection system and a transport system.
Figure 8:
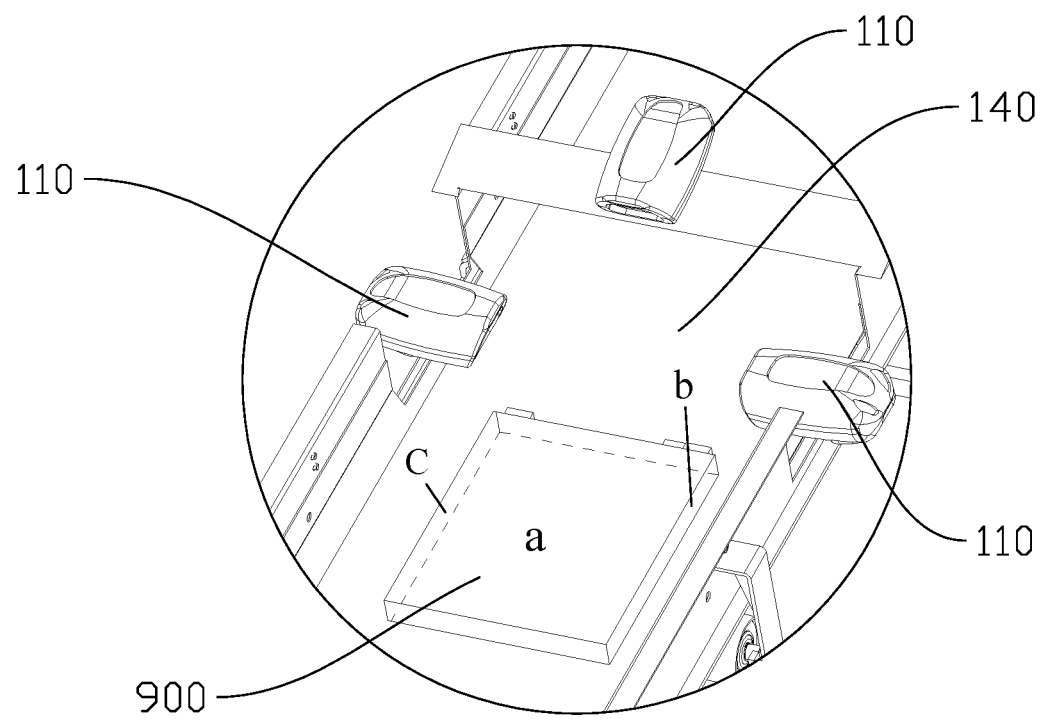
FIG. 8 is an enlarged partial view at A in FIG. 7.
Figure 9:
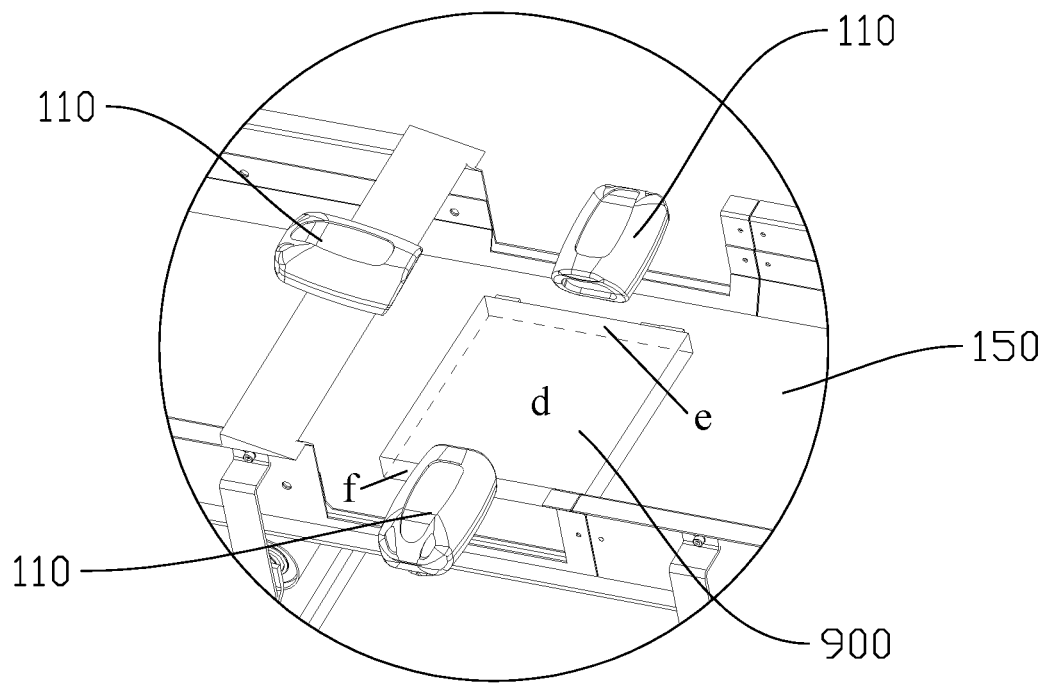
FIG. 9 is an enlarged partial view at B in FIG. 7.

In some of these embodiments, referring to FIGS. 7-9, the appearance detection system 100 includes a first conveyor belt 140 and a second conveyor belt 150 that are perpendicular to each other, where appearance detectors are provided on both sides of and above the first conveyor belt 140 and the second conveyor belt 150, respectively, that is, there are 6 appearance detectors in total, and when the battery cell 900 passes through the first conveyor belt 140, detectors located on both sides and above the first conveyor belt 140 can detect surfaces a, b and c of the battery cell 900, the first flipping device 120 is located between the output of the first conveyor belt 140 and the input of the second conveyor belt 150, and when the battery cell 900 is horizontally flipped 180° by the first flipping device 120 and then enters the second conveyor belt 150, the detectors located on both sides and above the second conveyor belt 150 can detect surfaces a, e and f of the battery cell 900, thus completing the six surface appearance scanning, and judging whether the appearance is qualified or not. The appearance detection system 100 completes the three-dimensional data collection of the appearance of the batteries during the transmission process thereof, realizes the high efficiency and accuracy of the appearance detection of the retired power batteries, and avoids human errors such as misjudgment and missed detection in the traditional detection.

Figure 10:
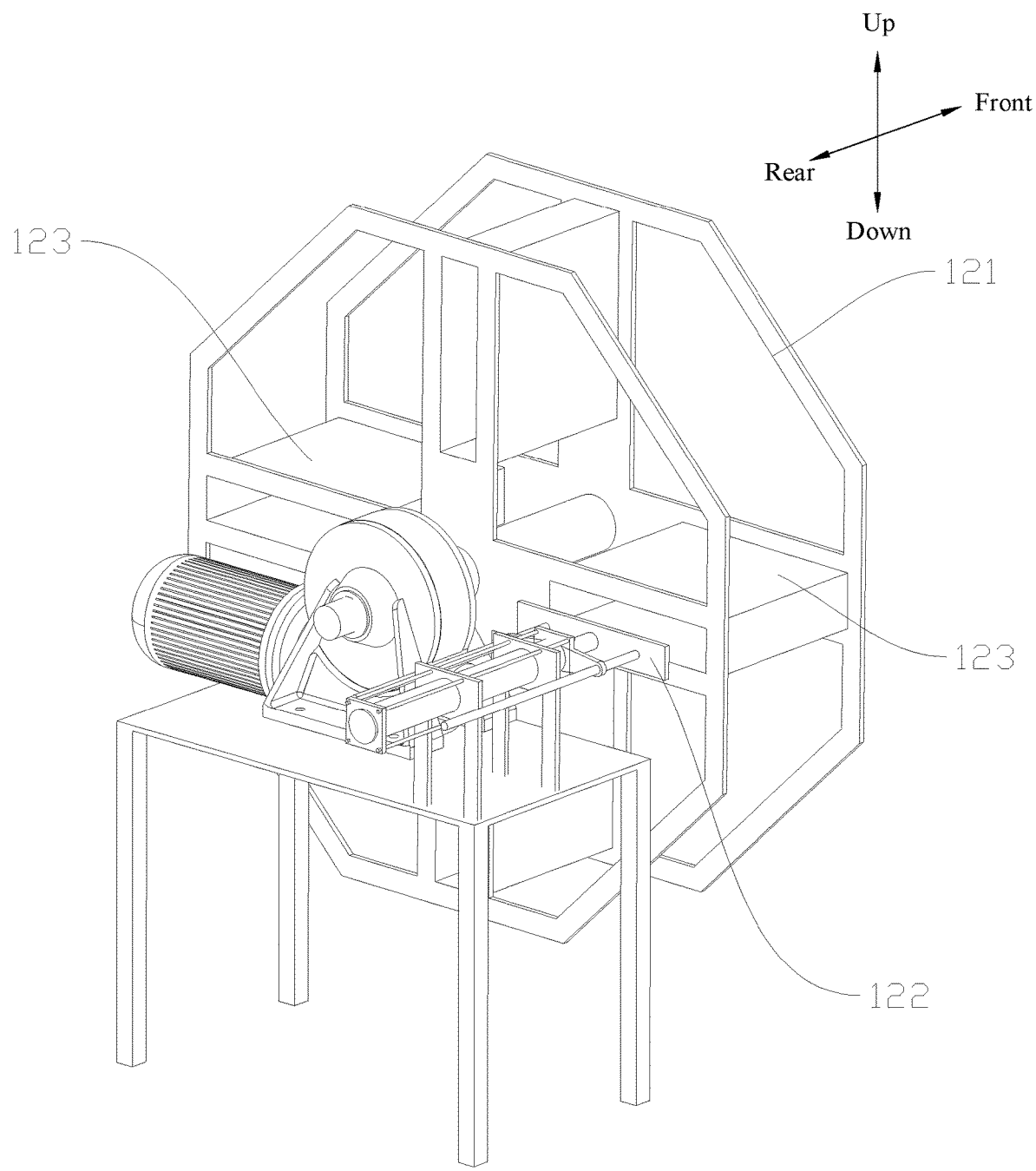
FIG. 10 is a structural schematic diagram of a first flipping device.

In some of the embodiments, referring to FIG. 10, the first flipping device 120 mainly realizes the flipping and voltage detection of the battery cell 900, the first flipping device 120 includes a rotating bracket 121 and a first push rod 122, where the rotating bracket 121 is provided with a loading chamber 123 for loading the battery cell 900, and the loading chambers 123 are at least two or more, preferably four, and uniformly distributed along the circumferential direction of the rotating bracket 121; the front and rear of the loading chamber 123 are respectively provided with a battery inlet and outlet and a push port, the battery inlet and outlet are aligned with the output end of the first conveyor belt 140, and when working, the loading chamber 123 first receives the battery cells 900 transferred from the first conveyor belt 140, and then the battery cell 900 enters from the battery inlet and outlet, the rotating bracket 121 rotates 180° to drive the loading chamber 123 to flip 180° together so that the loading chamber 123 loaded with the battery cell 900 is moved to the next station, i.e., an ejection station; at this time, the battery cell 900 has been flipped 180° with the loading chamber 123, and the first push rod 122 is located at the ejection station, and the first push rod 122 enters the loading chamber 123 through the push port to push the battery cell 900 out to the input end of the second conveyor belt 150, providing conditions for completing the appearance detection of the other three surfaces of the battery cell 900. The voltage detector is provided on the front end surface of the first push rod 122, and when the battery cell 900 is pushed out from the first push rod 122, the voltage detector contacts with the electrodes to measure the voltage of the battery cell 900. The first flipping device 120 can both flip the battery cell 900 and detect the voltage, and the size of the loading chamber 123 is designed according to the battery cell 900, and the flipping process does not damage the battery cell 900.

Figure 11:
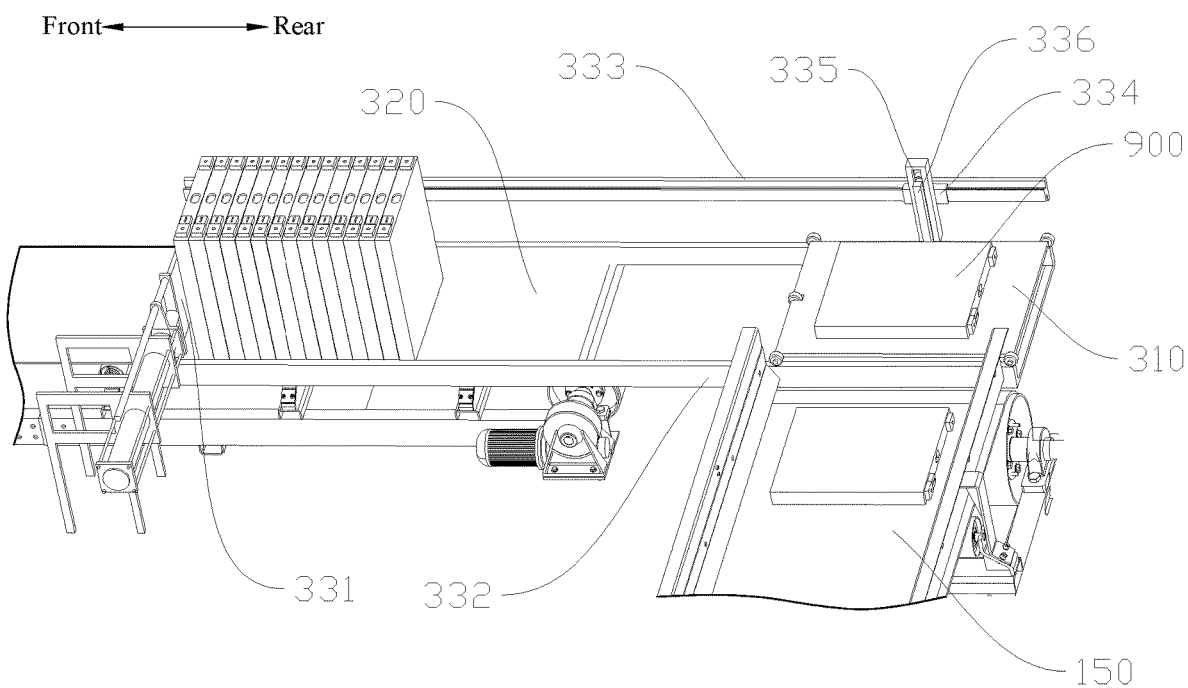
FIG. 11 is a structural schematic diagram of a transport system.

In some of these embodiments, referring to FIG. 11, the delivery mechanism is a third conveyor belt 320, the second flipping device is located between the output end of the second conveyor belt 150 and the input end of the third conveyor belt 320, and the second flipping device includes a telescopic first baffle plate 331, a flipping table 310 with wheels, a traveling rail 332 and a pulling mechanism, where the first baffle plate 331 is located on the third conveyor belt 320 and driven by an air cylinder, the traveling rail 332 is parallel to the third conveyor belt 320, and a second push rod is provided at one side of the tail end of the third conveyor belt 320; in an initial state, the flipping table 310 is horizontally provided, the battery cells 900 may be received from the second conveyor belt 150, and when working, the pulling mechanism pulls the flipping table 310 along the traveling rail 332 until the flipping table 310 enters the third conveyor belt 320, where the front wheel of the flipping table 310 contacts the first baffle plate 331, the pulling mechanism continues to pull forward the flipping table 310; and because of the blocking effect of the first baffle plate 331, the entire flipping table 310 rotates forward with the front wheel as the axis, and the battery cell 900 is flipped 90°; as there is a certain distance in the vertical direction between the flipping table 310 and the third conveyor belt 320, after being flipped, the battery cell 900 falls onto the third conveyor 320, and the next battery cell 900 is flipped in the same manner, but the blocking effect is not caused by the first baffle plate 331 but is flipped by the blocking of the previous battery cell 900; and when a certain quantity of battery cells 900 (e.g. 15) are gathered at the first baffle plate 331, the first baffle plate 331 automatically pulls away so that a set of battery cells 900 can be driven by the third conveyor belt 320 to the end of the third conveyor belt 320, and a gear rod 321 is further provided at the end of the third conveyor belt 320, and after the battery cells 900 contact the gear rod 321, the battery cells 900 can stay for a few seconds so that a group of battery cells 900 can be pushed closer by the third conveyor belt 320; finally, the second push rod pushes the whole group of battery cells 900 out of the third conveyor belt 320 to the next process. The transport system 300 is ingeniously designed to flip the battery cells 900 using a flipping table 310 and assemble a plurality of battery cells 900 into groups using a third conveyor belt 320 to prepare for batch residual energy detection in the next process.

Figure 12:
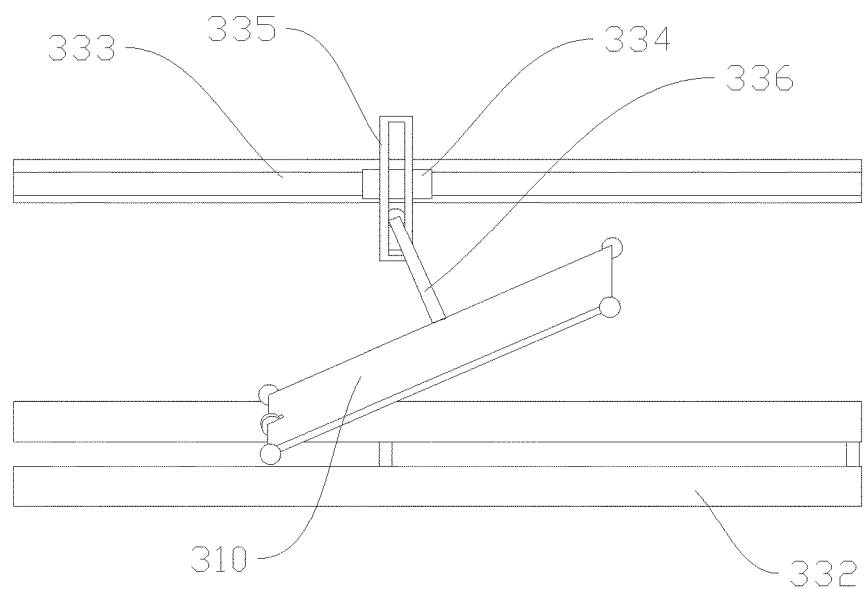
FIG. 12 is a structural schematic diagram of a second flipping device.

In some of these embodiments, referring to FIG. 12, the pulling mechanism includes a slide rail 333, a slider 334, an inner T-shaped sliding slot 335 and a first connecting rod 336, where the slide rail 333 is parallel to the third conveyor belt 320 and is located above the side of the flipping table 310, one end of the first connecting rod 336 is connected to the sliding slot 335 through a pulley, the sliding slot 335 is fixedly connected to the slider 334 so that the sliding slot 335 is movable along the slide rail 333, the other end of the first connecting rod 336 is fixedly connected to the flipping table 310, the slider 334 moves along the slide rail 333 to drive the sliding slot 335 to move, and the sliding slot 335 drives the first connecting rod 336 to move, and then the first connecting rod 336 drives the flipping table 310 to move along the traveling rail 332 until entering the third conveyor 320, and when the front wheel of the flipping table 310 contacts the first baffle plate 331, the slider 334 continues to move forward along the slide 333, and the flipping table 310 is still pulled by the connecting rod, so that the whole flipping table 310 rotates forward with the front wheel as the axis under the blocking of the first baffle plate 331. The pulling mechanism only uses the driving force provided by the slide rail 333 of the slider 334 to complete the horizontal movement and the vertical flipping movement of the flipping table 310. The pulling mechanism has one-step work and ingenious structure.

Figure 13:
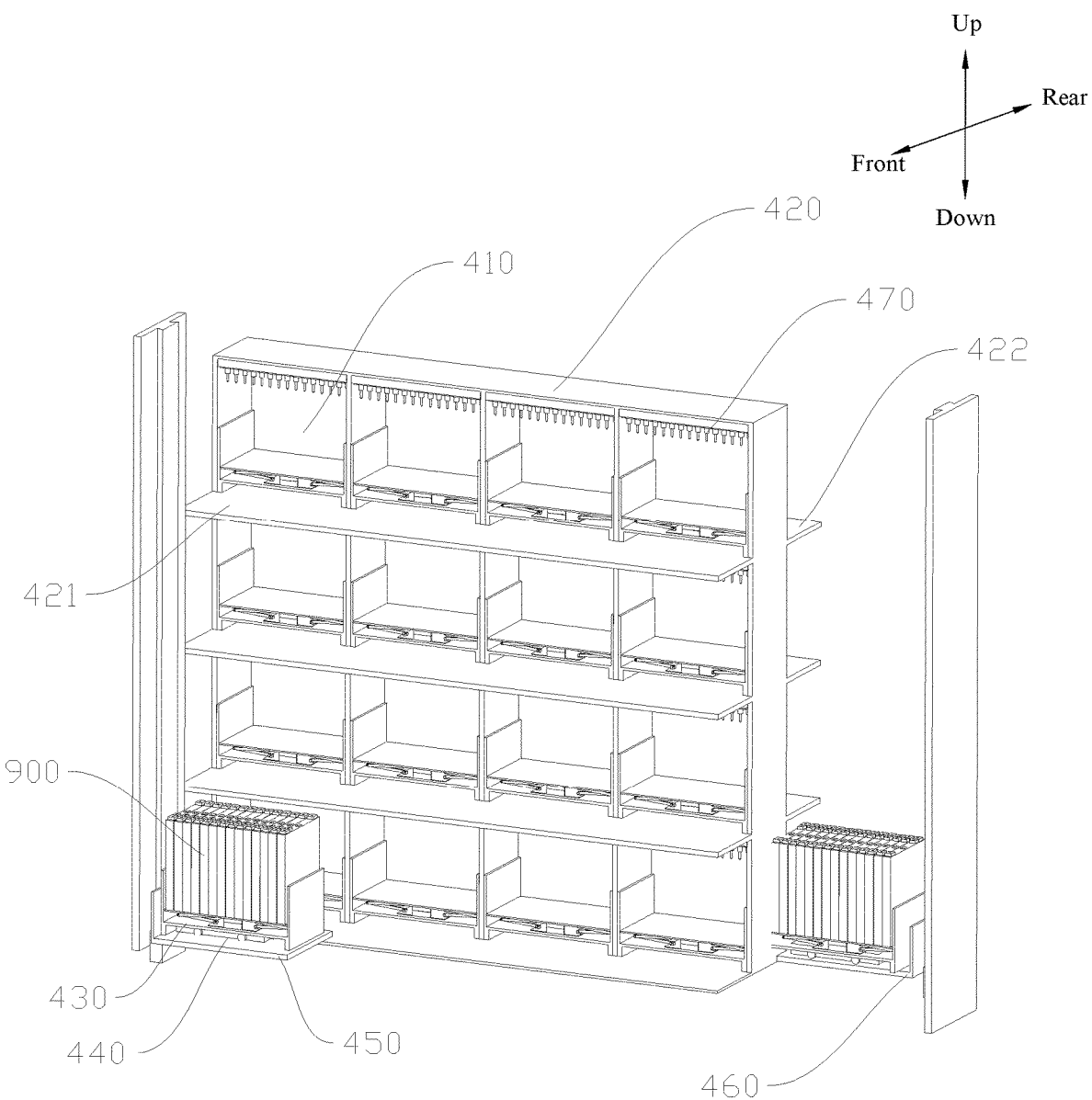
FIG. 13 is a structural schematic diagram of a residual energy detection device.

In some of these embodiments, referring to FIG. 13, the residual energy detection device 400 includes:

- a capacity measuring frame 420 being of a vertical multi-layer frame structure in which each layer is provided with a plurality of capacity measuring chambers 410, and a plurality of capacity measuring needles (470) are provided above the inside of each of the capacity measuring chambers (410). In this embodiment, the capacity measuring frame 420 has four layers, each layer has four capacity measuring chambers 410, the front and rear of the capacity measuring chambers 410 are open, and each layer is provided with a front transport plate 421 and a rear transport plate 422, and the front transport plate 421 and the rear transport plate 422 are used as materials to enter the transportation aisles of each capacity measuring chamber 410;
- a feeding mechanism including a liftable loading rack 430, a jacking transport trolley 440 and a first lifting table 450, where the first lifting table 450 is provided on the lateral side of the loading rack 430 for lifting movement, particularly, located on the lateral side of the front transport plate 421, the initial position of the first lifting table 450 is located on the lateral side of the third conveyor belt 320, the jacking transport trolley 440 can move to the lower part of the loading rack 430 and lift the loading rack 430, and the jacking transport trolley 440 can move back and forth between the capacity measuring frame 420 and the first lifting table 450, and the upper end surface of the jacking transport trolley 440 is provided with a pulling mechanism;
- a second lifting table 460 located on the lateral side of the loading rack 430 for lifting movement, particularly, located on the side of the rear transport plate 422, where the jacking transport trolley 440 can move back and forth between the capacity measuring frame 420 and the second lifting table 460.

The working process of the residual energy detection device 400 is as follows: the loading rack 430 is first placed on the first lifting table 450, the jacking transport trolley 440 is located below the loading rack 430, the second push rod pushes the battery cell 900 at the tail end of the third conveyor belt 320 onto the loading rack 430, the loading rack 430 is loaded with the battery cell 900 and is raised to any layer of the capacity measuring frame 420 by the first lifting table 450, the loading rack 430 is then lifted by the jacking transport trolley 440 and transported from the front transport plate 421 to the capacity measuring chamber 410, and then the jacking transport trolley 440 lowers the loading rack 430 to land, the landed loading rack 430 lifts the power batteries until the electrodes of the battery cell 900 contact with the capacity measuring needle 470, and the capacity measuring needle 470 charges and discharges the battery cell 900, and finally, the measurement data is transmitted to the control platform so that the assembly device in the next process can accurately group and sort, and after the detection is completed, the loading rack 430 is lowered, and the jacking transport trolley 440 transports the loading rack 430 to the second lifting table 460 through the rear transport plate 422, and then descends along with the second lifting table 460 for the next process, that is, grouping. The residual energy detection device 400 can realize batch detection, automatic feeding and discharging, and automatic grouping, thus solving the problems of large labor, low detection efficiency, high grouping error rate and the like in traditional residual energy detection.

Figure 14:
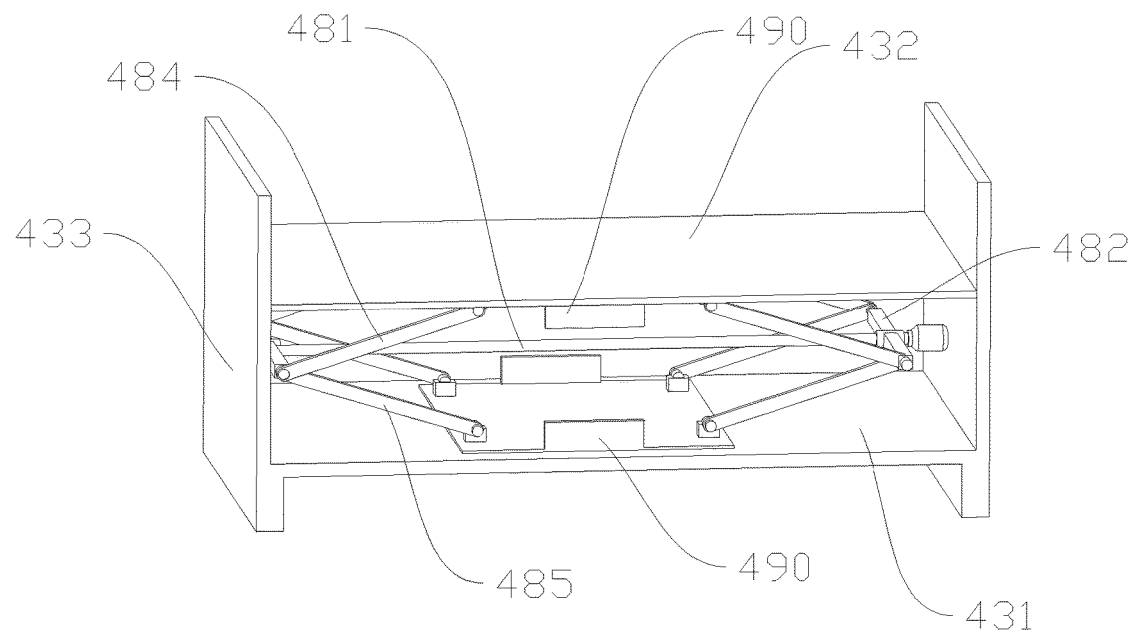
FIG. 14 is a structural schematic diagram of a loading rack.
Figure 15:
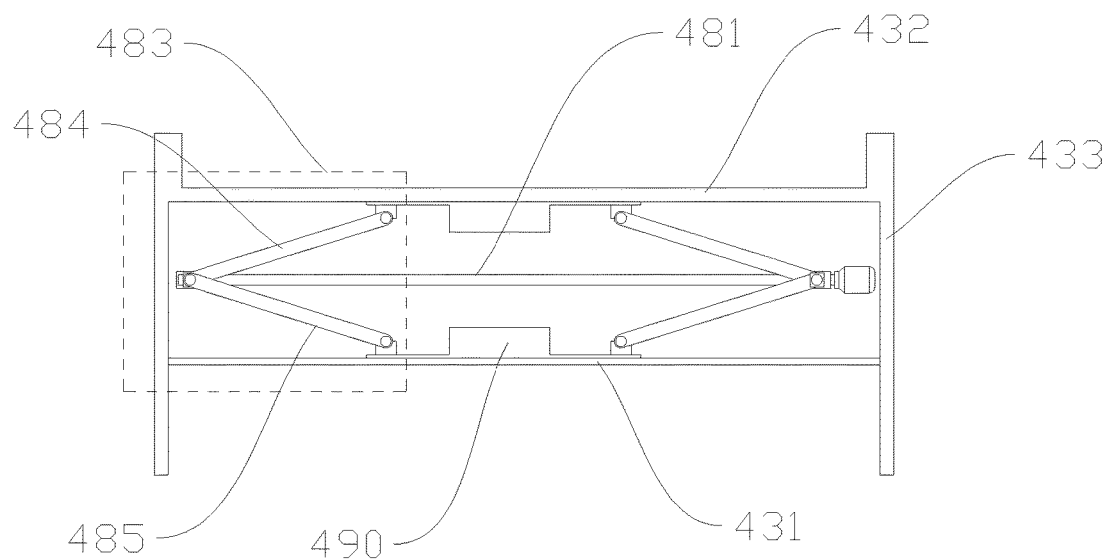
FIG. 15 is an orthographic view of a loading rack.

In some of these embodiments, referring to FIGS. 14-15, the loading rack 430 includes a base bracket and a horizontal support plate 432, where the base bracket is an H-shaped frame consisting of a horizontal bottom plate 431 and two vertical side plates 433, the horizontal support plate 432 is located above the bottom plate 431 and is not higher than the side plates 433, a jacking mechanism is provided between the horizontal support plate 432 and the bottom plate 431, and the jacking mechanism can jack up the horizontal support plate 432. The lower half part of the side plate 433 of the H-shaped frame serves as a supporting foot, and the upper half part of the side plate 433 of the H-shaped frame serves as a guard plate to prevent the power batteries from falling down during moving, so the structure is simple and practical.

In some of these embodiments, the jacking mechanism includes a screw shaft 481, a cross bar 482 and two groups of telescopic frame mechanisms 483 that are symmetrical, where the cross bar 482 is symmetrically provided at both ends of the screw shaft 481 and threaded with the screw shaft 481, the telescopic frame mechanism 483 includes a third connecting rod 484 and a fourth connecting rod 485, one end of the third connecting rod 484 is hinged with the horizontal support plate 432 and the other end is hinged with the cross bar 482, one end of the fourth connecting rod 485 is hinged with the bottom plate 431 and the other end is hinged with the cross bar 482, and the telescopic frame mechanism 483 is folded in an initial state, the screw shaft 481 rotates to drive the cross bar 482 to move opposite to the screw shaft 481 so that the telescopic frame mechanism 483 is opened and the support plate is lifted, the screw shaft 481 is driven by a motor, and the reverse rotation of the motor can lower the horizontal support plate 432. The jacking mechanism can complete the opening and folding of the telescopic frame only through the transmission of a screw shaft 481, and therefore is ingenious in design and stable and reliable in lifting process.

In some of these embodiments, each set of telescopic frame mechanisms 483 includes two third connecting rods 484 and two fourth connecting rods 485, and one third connecting rod 484 and one fourth connecting rod 485 are distributed on two sides of the screw shaft 481 so that all four corners of the horizontal support plate 432 are stressed, thereby improving the stability.

In some of these embodiments, a limit block 490 is provided between the horizontal support plate 432 and the bottom plate 431, the limit block 490 is used to limit the minimum distance between the horizontal support plate 432 and the bottom plate 431, particularly, the limit block 490 can be fixed on the lower end surface of the horizontal support plate 432 and the upper end surface of the bottom plate 431, and the horizontal support plate 432 is lowered until the two limit blocks 490 contact each other; the limit block 490 can not only limit the position, but also prevent the hinge and the connecting rod from sticking when the horizontal support plate 432 drops too low.

Figure 16:
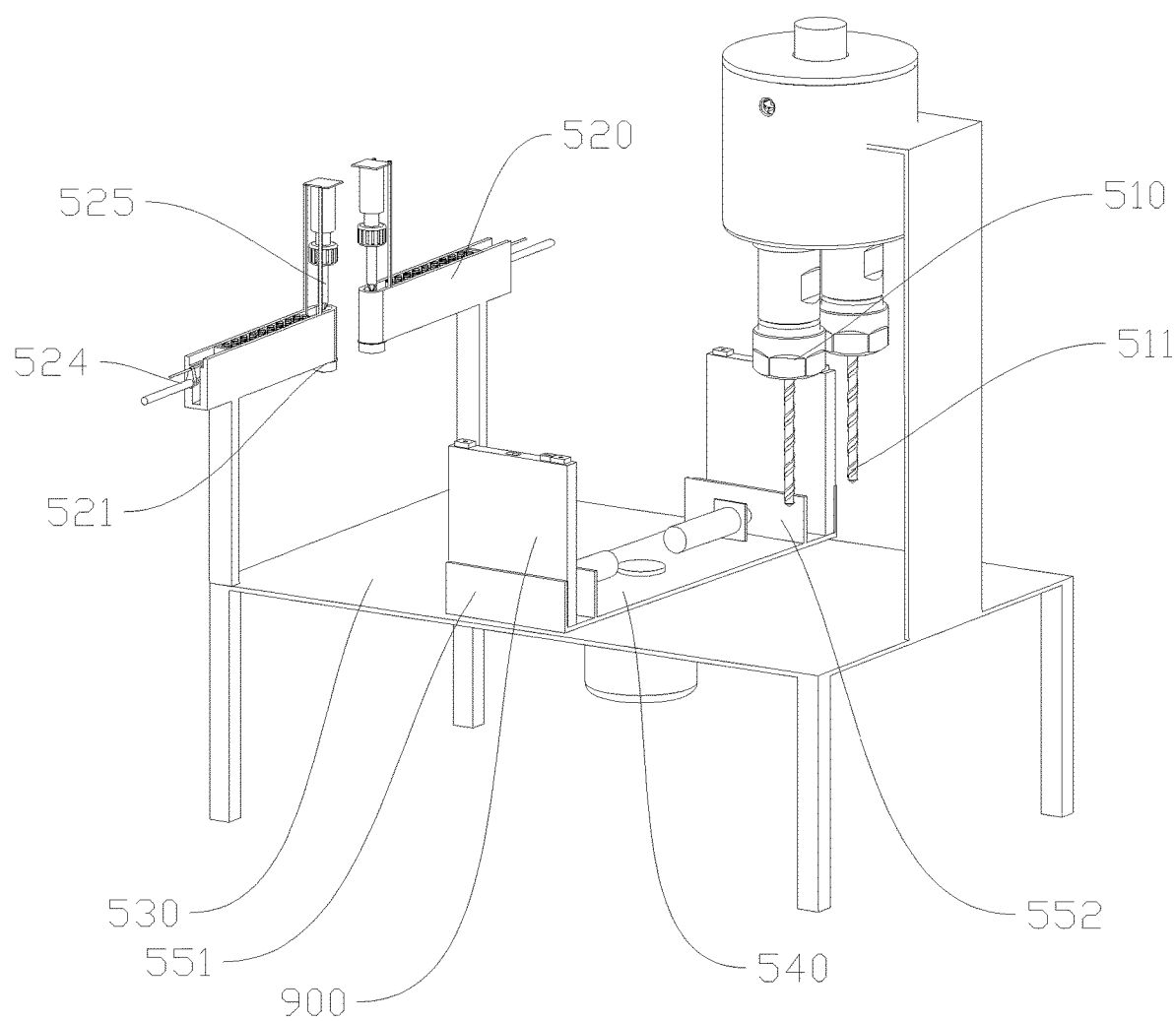
FIG. 16 is a schematic diagram of the overall structure of a tab installation device.

In some of these embodiments, referring to FIG. 16, the tab installation device 500 further includes:
  a working table 530 on which a drilling mechanism 510 is installed, the drilling mechanism 510 including two drill bits 511 that are vertically downward, a screwing station being installed on the working table 530, and the screwing station including two nail dropping openings 521;
  a horizontal rotating table 540 located between the drilling mechanism 510 and the screwing station, the rotating table 540 being provided with a clamping mechanism for clamping the power batteries; and
  when working, the electrodes of the power battery are faced upward and clamped by the clamping mechanism and then rotate to the drilling mechanism 510 along with the rotating table 540 so that the two electrodes of the power battery are respectively aligned with the two drill bits 511, and the drilled power battery is rotated to the screwing station along with the rotating table 540 so that the two electrodes of the power battery are respectively aligned with the two nail dropping openings 521.

In some of these embodiments, the rotating table 540 is rectangular, there are two clamping mechanisms which are symmetrically provided at both ends of the rotating table 540, and two power batteries are respectively placed on clamping mechanisms at both ends, and when one of the power batteries is drilled, and then rotates 180° along with the rotating table 540 to reach the screwing station, the power battery at the other end of the rotating table 540 also reaches the drilling mechanism 510 at the same time, so as to realize simultaneous operation at the two stations, thereby improving efficiency.

In some of these embodiments, the clamping mechanism includes a vertical second baffle plate 551 and a fourth push rod 552, where a slot in which the power battery can be placed is formed between the second baffle plate 551 and the fourth push rod 552, and the power battery is placed in the slot, and the fourth push rod 552 pushes toward the power battery so that the power battery is clamped and fixed under the joint action between the second baffle plate 551 and the fourth push rod 552. This structure is simple, firm in positioning is firm and not easy to loosen.

Figure 17:
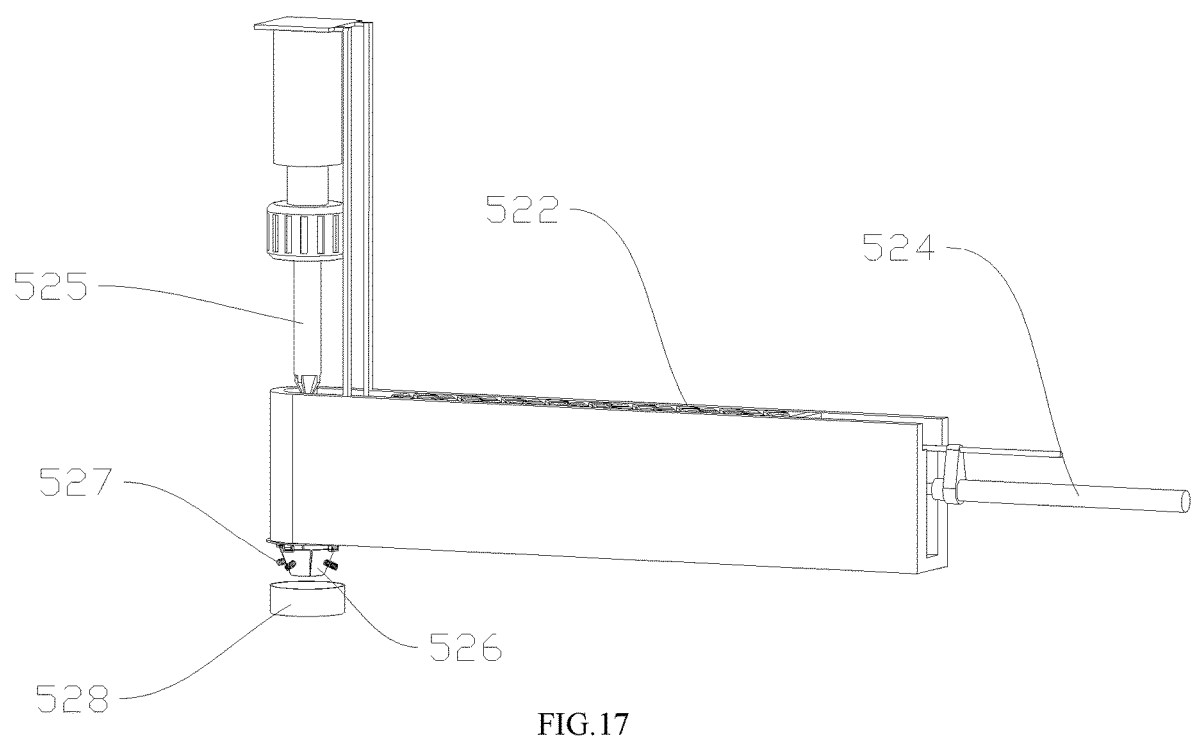
FIG. 17 is a structural schematic diagram of a screwing mechanism.

In some of these embodiments, the screwing station includes two screwing mechanisms 520 that are symmetrical, referring to FIG. 17 for the screwing mechanism 520, the screwing mechanism 520 includes a long sliding slot 522 for loading screws and a limit dire assembly 523, the nut of the screw is faced upward, a nail dropping opening 521 is provided at one end of the long sliding slot 522, and a fifth push rod 524 is provided at the other end of the long sliding slot 522, the fifth push rod 524 pushes the screw to move to the nail dropping opening 521 along the long sliding slot 522, and a screwdriver 525 that can move up and down and rotate above the nail dropping opening 521 is provided; the limit dire assembly 523 is provided below the nail dropping opening 521, the limit dire assembly 523 includes more than two opening and closing hinges 526, the opening and closing hinges 526 form a sleeve which is wide on the top and narrow at the bottom, the opening at the bottom end of the sleeve is consistent with the thread size of the screw, and the opening at the upper end is consistent with the nut of the screw, and the sleeve can be opened and closed elastically.

When falling from the nail dropping opening, the screw is first stuck in the sleeve, and at this moment, the screwdriver 525 moves downward against the screw and slowly expands the opening and closing hinge 526. In this process, the plum slot on the top of the nut cooperates with the plum protrusion of the screwdriver 525, and then the screwdriver 525 rotates to complete the screwing step. The screwing mechanism 520 can achieve automatic blanking and tightening of screws, thereby improving not only production efficiency but also assembling accuracy.

In some of these embodiments, the inner walls of both sides of the long sliding slot 522 have a step structure with a wide upper part and a narrow lower part, the nut of the screw is placed upwards in the long sliding slot 522, and the step supports the nut so that the screw can be suspended on the long sliding slot 522 and slide back and forth, the step structure can keep the screw vertical all the time and slide forward to the nail dropping opening 521, so as to ensure that the screw is completely vertical when falling from the nail dropping opening 521, which is more conducive to the smooth insertion of the screw into the electrode hole.

In some of these embodiments, the upper end of the opening and closing hinge 526 is hinged with the edge of the nail dropping opening 521, a sleeve 528 is provided on the outer sleeve and the sleeve 528 is fixedly connected with the long sliding slot 522, and a spring 527 is provided between the opening and closing hinge 526 and the sleeve 528, so that the opening and closing hinge 526 can be reset under the action of the elastic force pressing the spring 527, and the spring 527 and the opening and closing hinge 526 form an elastic opening and closing member. The structure is single and durable.

In some of these embodiments, the tab welding station 630 includes a solderer for soldering tabs and wires together, the solderer is driven by a mechanical arm, and the battery cells 900 with staggered positive and negative electrodes are connected in series by the solderer.

In some of these embodiments, the cover plate installation station 640 includes an electromagnetic suction cup and a screwing mechanism 520, where the electromagnetic suction cup and the screwing mechanism 520 are respectively driven by a mechanical arm, the electromagnetic suction cup sucks up the upper cover of the energy storage cabinet 610 and places the same above the energy storage cabinet 610, and then the upper cover and the energy storage cabinet 610 are connected by the screwing mechanism 520, where the screwing mechanism 520 is the same as the screwing mechanism 520 of the tab installation device 500.

The embodiments of the present disclosure have been described in detail in conjunction with the drawings, but the present disclosure is not limited to the above-mentioned embodiments, and various changes can be made within the scope of knowledge possessed by those of ordinary skill in the art without departing from the purpose of the present disclosure.

The invention claimed is:

1. An automatic production line for cascade utilization of power batteries sequentially provided along a transmission direction of materials comprising:
   an appearance detection system comprising an appearance scanner, a first flipping device and a voltage detector, wherein three surfaces of a battery cell are detected by the appearance scanner, and then the battery cell is flipped 180° by the first flipping device, and then the remaining three surfaces of the battery cell are detected;
   a screening device comprising a first gripper for clamping battery cells with unqualified appearance and low voltage;
   a transport system comprising a second flipping device and a delivery mechanism, wherein the battery cell is flipped 90° by the second flipping device so that an electrode is faced upward, and the flipped battery cell is delivered to the next process by the delivery mechanism;
   a residual energy detection device comprising a plurality of capacity measuring chambers above which a capacity measuring needle is provided, wherein the capacity measuring needle is capable of contacting with the electrodes of the battery cell after the battery cell enters the capacity measuring chamber;
   a tab installation device comprising a drilling mechanism and a screwing station;
   an assembling system sequentially provided with a grouping station, a tab welding station and a cover plate installation station, wherein the grouping station places the battery cells installed with the tab into an energy storage cabinet according to the staggered arrangement of positive and negative electrodes, the tab welding station connects the battery cells with staggered positive and negative electrodes in series, and the cover plate installation station connects an upper cover with the energy storage cabinet; and
   a grouping device comprising a second gripper that is located among the residual energy detection device, the tab installation device and the grouping station, wherein the second gripper sorts and clamps the battery cells subjected to residual energy detection to the tab installation device for tab installation followed by clamping to the grouping station.

2. The automatic production line for cascade utilization of power batteries of claim 1, further comprising a film sticking device, wherein the screening device is capable of clamping the battery cells with unqualified appearance to the film sticking device for film sticking; and the film sticking device comprises:
   a film sticking platform;
   a film belt spreading mechanism for spreading a film roll and laying the spread film on the film sticking platform to form a film belt;
   a first rolling rod assembly comprising two first rolling rods that are horizontally provided, wherein the first rolling rods are located below the film belt, and in a working state, the battery cell is placed on the film belt, and the two first rolling rods move upwards to attach the film belt to the front and rear surfaces of the battery cell;
   a second rolling rod assembly provided on both sides of the film sticking platform, wherein the second rolling rod assembly comprises second rolling rod brackets that is capable of being opened and closed, each of the second rolling rod brackets is provided with two vertical second rolling rods, and the second rolling rod assembly is capable of moving to both sides of the battery cell and driving the second rolling rods to roll on the left and right sides of the battery cell through the opening and closing movement of the second rolling rod brackets so that the film belt is attached to the left and right sides of the battery cell; and
   a pressure rod absorbing the film paper and then moving to the upper part of the battery cell and pressing the film paper to the upper surface of the battery cell.

3. The automatic production line for cascade utilization of power batteries of claim 1, wherein the appearance detection system comprises a first conveyor belt and a second conveyor belt which are perpendicular to each other, wherein appearance detection instruments are respectively provided on both sides of and above the first conveyor belt and the second conveyor belt, and the first flipping device is located between the output end of the first conveyor belt and the input end of the second conveyor belt.

4. The automatic production line for cascade utilization of power batteries of claim 3, wherein the first flipping device comprises a rotating bracket and a first push rod, the rotating bracket is provided with a loading chamber for loading the battery cell, the front and rear of the loading chamber are respectively provided with battery inlet and outlet and a push port, the battery inlet and outlet are aligned with the output end of the first conveyor belt, the battery cell enters the loading chamber from the battery inlet and outlet, the rotating bracket rotates 180° to drive the loading chamber to flip 180°, and then the first push rod enters the loading chamber through the push port to push the battery cell out to the input end of the second conveyor belt, and the voltage detector is provided on the first push rod.

5. The automatic production line for cascade utilization of power batteries of claim 1, wherein the delivery mechanism is a third conveyor belt, the second flipping device is located between the output end of the appearance detection system and the input end of the third conveyor belt, and the second flipping device comprises a first baffle plate that is telescopic, a flipping table, a traveling rail and a pulling mechanism, wherein the first baffle plate is located on the third conveyor belt, the traveling rail is parallel to the third conveyor belt, and a second push rod is provided on one side of the tail end of the third conveyor belt; the flipping table is horizontally provided in an initial state, and when working, the pulling mechanism pulls the flipping table to move along the traveling rail until the flipping table enters the third conveyor belt and then abuts against the first baffle plate and flips 90° so that the electrodes of the battery cell are faced upward.

6. The automatic production line for cascade utilization of power batteries of claim 5, wherein the pulling mechanism comprises a slide rail and a first connecting rod, the slide rail is parallel to the third conveyor belt and is located above the side of the flipping table, one end of the first connecting rod is movably connected with the slide rail and the other end of the first connecting rod is connected with the flipping table.

7. The automatic production line for cascade utilization of power batteries of claim 1, wherein the residual energy detection device comprises:
  a capacity measuring frame being of a vertical multi-layer frame structure in which each layer is provided with a plurality of capacity measuring chambers;
  a feeding mechanism comprising a liftable loading rack, a jacking transport trolley and a first lifting table, wherein the first lifting table is provided on the lateral side of the loading rack for lifting movement, the jacking transport trolley is capable of moving below the loading rack and lifting the loading rack, and the jacking transport trolley is capable of moving back and forth between the capacity measuring frame and the first lifting table;
  when feeding, the loading rack is loaded with battery cells and rises to any layer of the loading rack through the first lifting table, and then is transported to the capacity measuring chamber through the jacking transport trolley, and the loading rack lifts the battery cells until the electrodes of the battery cells contact with the capacity measuring needle; and
  a second lifting table located on the lateral side of the loading rack for lifting movement, wherein the jacking transport trolley is capable of moving back and forth between the capacity measuring frame and the second lifting table, and when discharging, the jacking transport trolley transports the loading rack to the second lifting table and descends along with the second lifting table.

8. The automatic production line for cascade utilization of power batteries of claim 1, wherein the tab installation device further comprises:
  a working table, the drilling mechanism being installed on the working table, the drilling mechanism comprising two drill bits that are vertical downward, the screwing station being installed on the working table, and the screwing station comprising two nail dropping openings;
  a horizontal rotating table located between the drilling mechanism and the screwing station, wherein the rotating table is provided with a clamping mechanism for clamping the power batteries; and
  when working, the electrodes of the power battery are faced upward and clamped by the clamping mechanism and then rotate to the drilling mechanism along with the rotating table so that the two electrodes of the power battery are respectively aligned with the two drill bits, and the drilled power battery rotates to the screwing station along with the rotating table so that the two electrodes of the power battery are respectively aligned with the two nail dropping openings.

9. The automatic production line for cascade utilization of power batteries of claim 1, wherein the tab welding station comprises a solderer for soldering tabs and wires together, and the solderer is driven by a mechanical arm.

10. The automatic production line for cascade utilization of power batteries of claim 1, wherein the cover plate installation station comprises an electromagnetic suction cup and a screwing mechanism which are respectively driven by a mechanical arm.

\* \* \* \* \*